Figure 1:
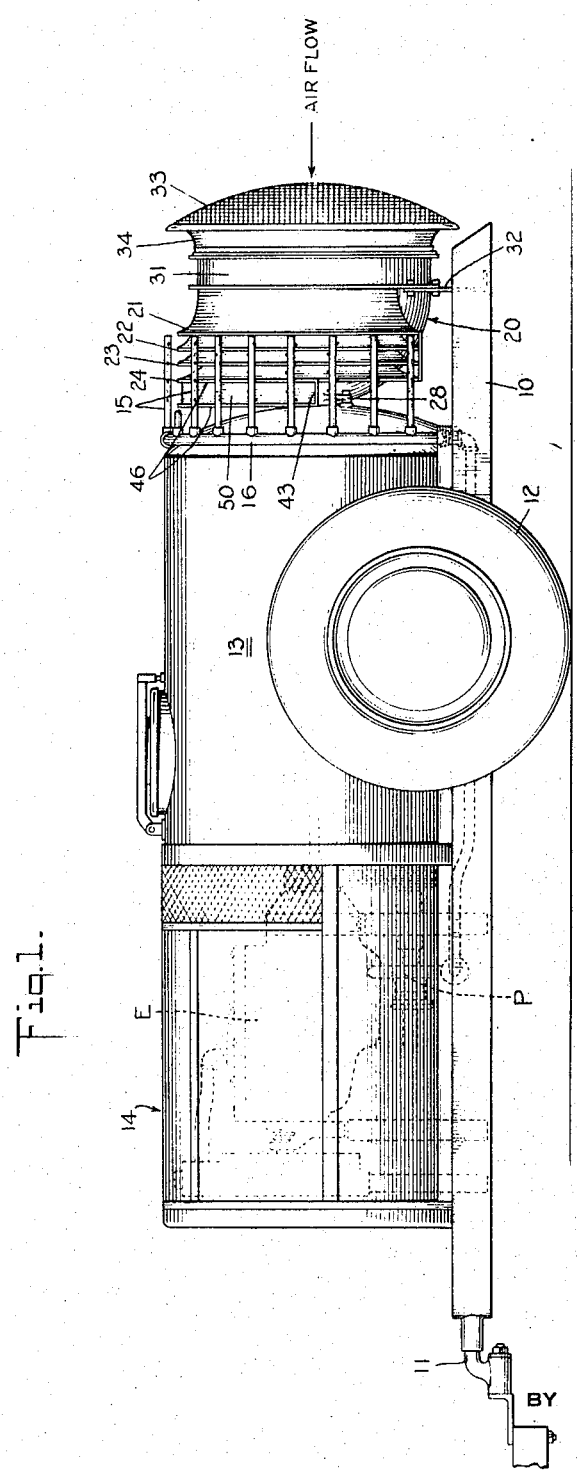

Sept. 25, 1951

R. A. ANDREWS 2,569,274

SPRAYING AND DUSTING MACHINE

Filed Aug. 25, 1947

5 Sheets-Sheet 1

INVENTOR
R. A. Andrews
BY
H.H.Golden
ATTORNEY

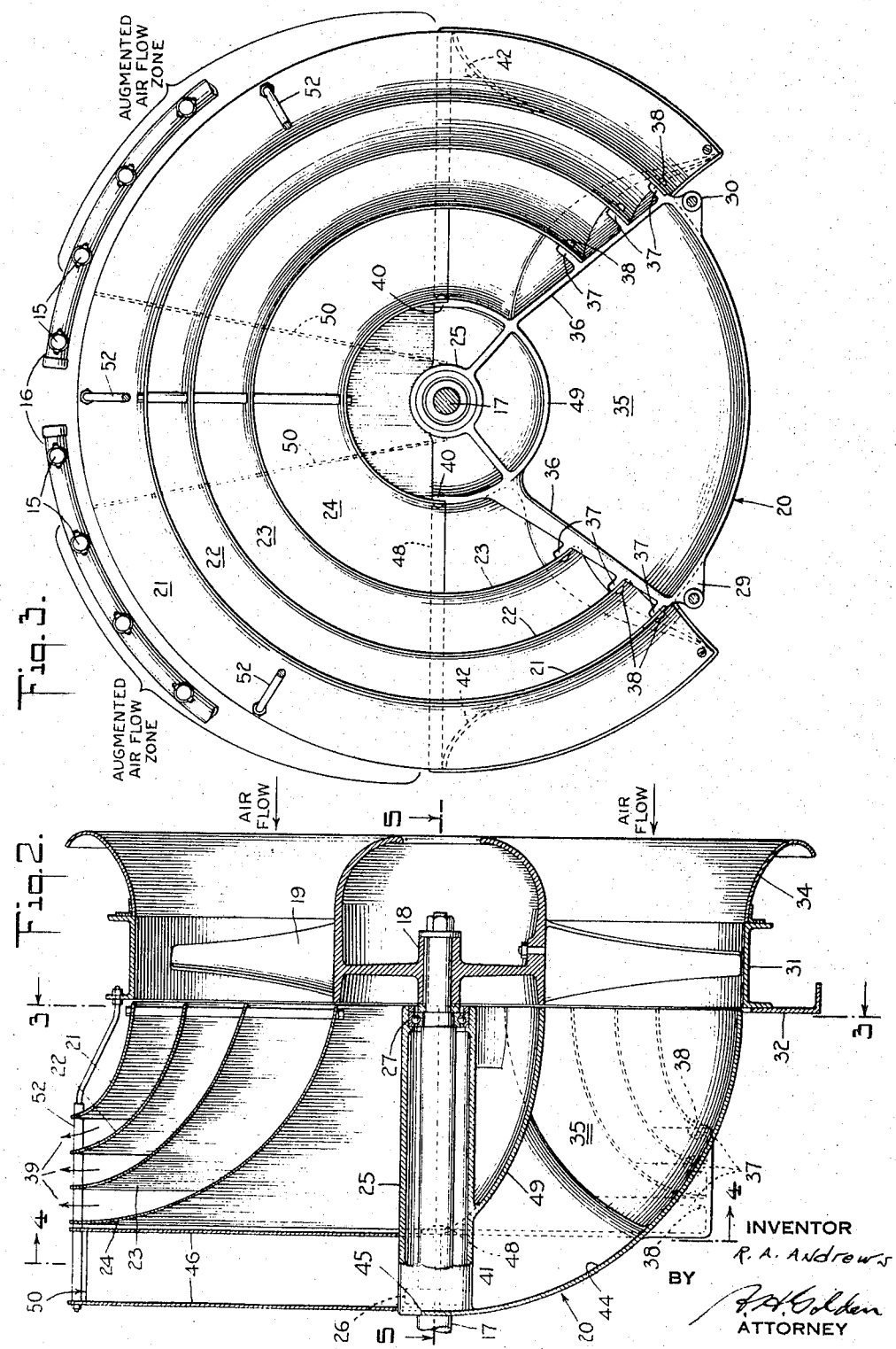

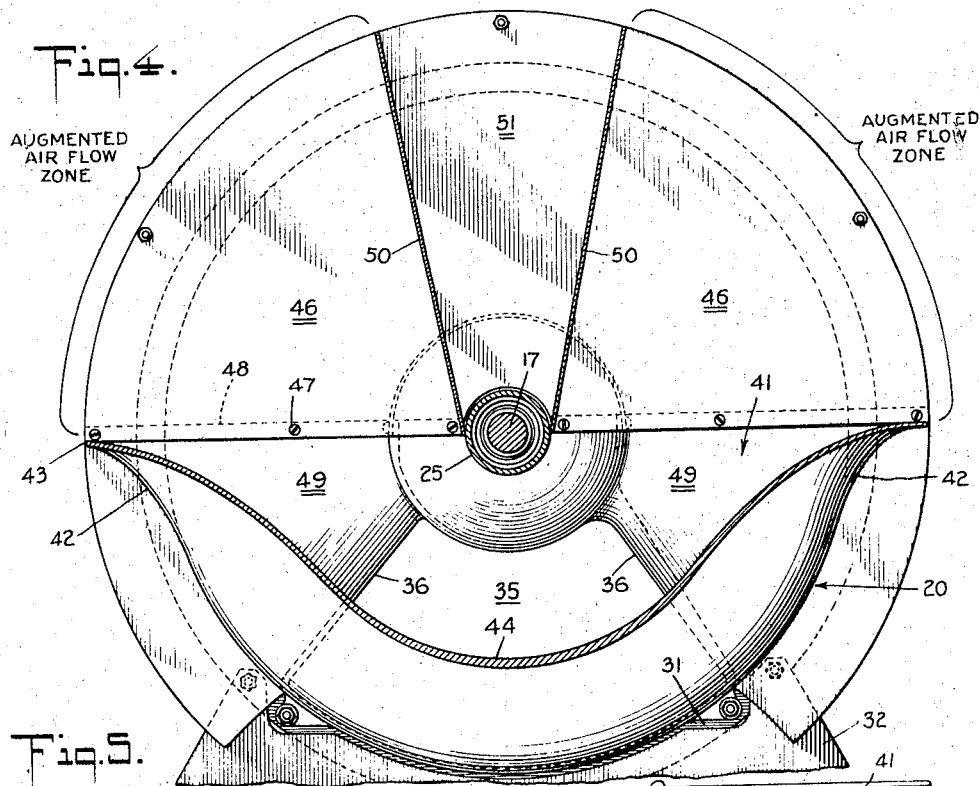
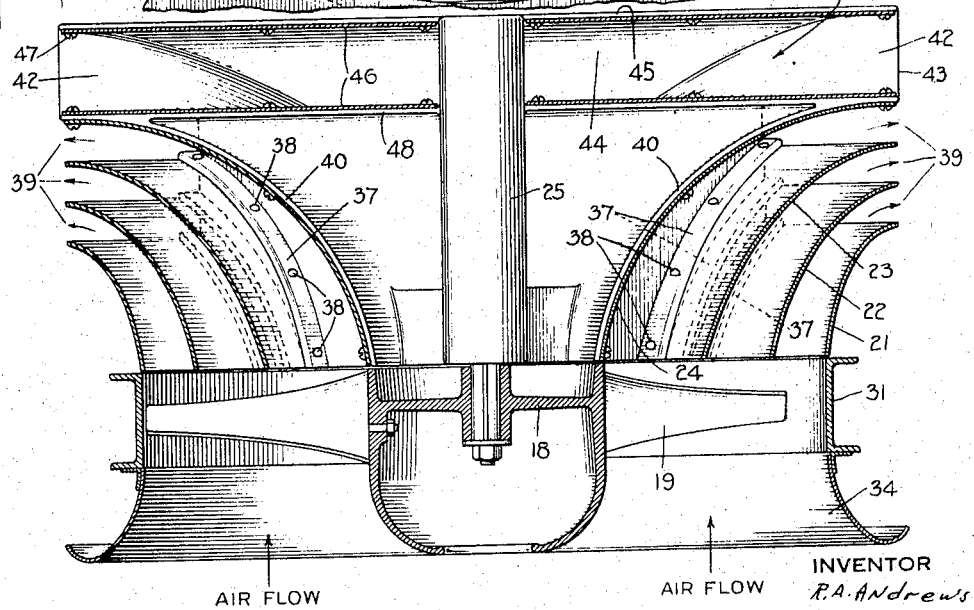

Sept. 25, 1951   R. A. ANDREWS   2,569,274
SPRAYING AND DUSTING MACHINE
Filed Aug. 25, 1947   5 Sheets-Sheet 4

AIR FLOW

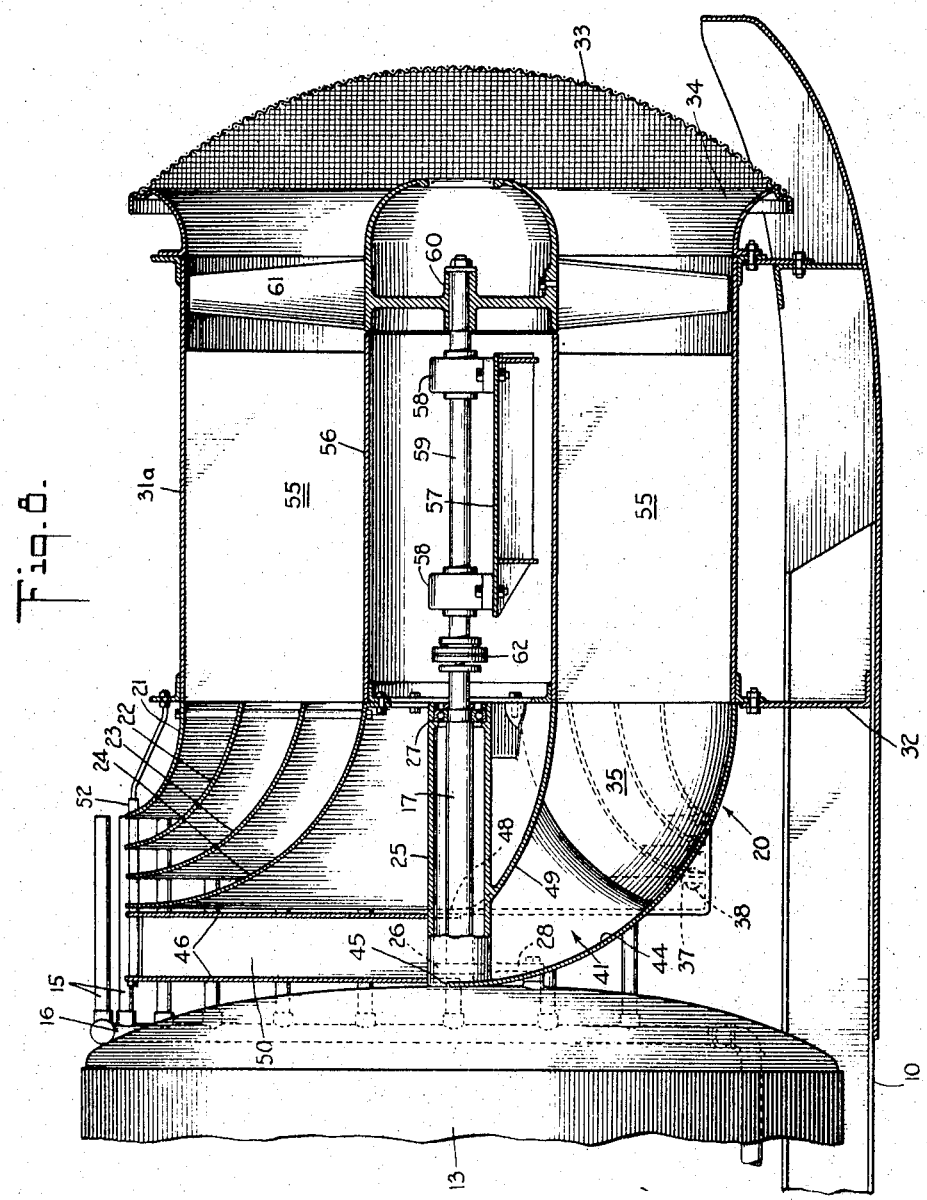

Patented Sept. 25, 1951

2,569,274

UNITED STATES PATENT OFFICE 2,569,274

SPRAYING AND DUSTING MACHINE

Richard A. Andrews, San Jose, Calif., assignor to Food Machinery and Chemical Corporation, San Jose, Calif., a corporation of Delaware Application August 25, 1947, Serial No. 770,361

17 Claims. (Cl. 261—30)

This invention relates to a spraying and dusting machine of the general type set forth in the Daugherty Patent No. 2,220,082, and in a later Daugherty Patent No. 2,476,960, dated July 26, 1949.

In the first Daugherty patent there is disclosed a new type of spraying and dusting machine in which a blast of air generated over an area is suitably directed by air deflecting means toward foliage that is to be sprayed or dusted, means being provided for feeding spraying or dusting material into the air blast. In the second Daugherty patent, there is set forth an improvement in the structure of the first Daugherty patent. Thus, in the machine of the second patent, there is generated a blast of air formed as a ring of air. This ring of air is adapted for deflection in a direction generally radially of the machine and toward the foliage to be sprayed.

By reference to the first Daugherty patent it will be noted that the entire blast of air is directed by deflectors toward a particular direction or directions. In a further Daugherty Patent No. 2,331,107, closely related to the first Daugherty patent, the blast of air is deflected toward each side of the machine and in the direction of foliage to be sprayed. It will be noted that in the machines shown in these two Daugherty patents, the lowermost portions of the air blast are merged with the remainder of the air blast, thereby requiring a very considerable system of deflectors. In the machine of the second Daugerty Patent No. 2,476,960, portions of the air deflecting system are blocked off, with the lowermost portion of the air blast moving in a rotary direction parallel to the direction of rotation of the air blast developed by the propeller to join those portions of the air blast that are deflected radially by the deflector system. Otherwise, the lowermost portion of the air blast would simply move radially against the ground.

It has been found that there is a considerable loss in efficiency because of this diversion of part of the air blast in the machine of the Daugherty Patent No. 2,476,960. Thus, that portion of the air blast that must rotate prior to moving radially of the machine toward the foliage to be sprayed, actually hinders the radial flow of the air blast that it joins. Moreover, it flows outwardly of the machine at a point or points where it is least useful. In the machines of the two Daugherty Patents, Nos. 2,220,082 and 2,331,107, that portion of the air blast developed at the bottom of the area over which the air blast flows is likewise inefficiently used because very considerable deflecting movement must be imparted thereto, and because this portion of the air blast cannot be used where it is most required; that is, at the upper portions of the machine known as the 11 o'clock and 1 o'clock sectors. These sectors, as those skilled in the art will readily recognize, are those just to the right and left of vertical when looking at the machine endwise.

It is the object of my invention to contribute means for utilizing efficiently that portion of the air blast that is developed at the lowermost portion of the machine of the class set forth in the Daugherty patents. Thus, it is the object of my invention to contribute air deflecting means that will make effective use of that portion of the air blast that is developed in an angular sector from which the normal flow of the air blast will contribute no effective dispersion of spraying and dusting material. As those skilled in the art will appreciate, this sector may be in different locations that will be determined in accordance with the type of machine utilized, the type of air blast developing means, and the particular foliage to be sprayed.

At this point, it will be well to add that while I have indicated generally that my invention is particularly adapted for utilization with those machines heretofore covered in the Daugherty patents, my invention may be utilized with other machines of the particular general class. Also, my machine may well be utilized with a type of radial flow spraying and dusting machine invented by George W. Daugherty and set forth in a recently filed patent application Serial No. 757,294 filed June 26, 1947, now abandoned. In this application, a blast of air is developed radially of the machine initially, and therefore flows toward the foliage at each side of the machine with a minimum of deflection. My invention is well adapted for utilization in a machine of the particular class described for the more effective employment of a part of the air blast that would otherwise not be used efficiently.

As one feature of my invention whereby the objects thereof are attained, I utilize a deflector that is adapted to receive a portion of the air blast and to direct this portion of the air blast so as to augment another portion of the air blast that is not received or directed by the deflectors. In this way, that portion of the air blast that is received by my new deflector, is used to augment another portion of the air blast. Therefore, where the lowermost angular sector of an air blast is received by my new deflector, this portion of the air blast may be directed to any other point that may be desired to augment the air blast at that other point. More particularly, my invention is probably best utilized to augment the air blast in the 11 o'clock and 1 o'clock zones so as to reach high trees. Of course, it may be well to augment other zones, as where low trees are to be sprayed at considerable distances from each side of the machine, or where all the blast is required to flow to one side of the machine. This will all be well understood by men skilled in the art who will be able to adapt my invention for their special needs.

As a further feature of my invention, I utilize a deflector system adapted to direct the air blast toward foliage to be sprayed, with a particular portion of the deflector system positioned to receive a part of the air blast and to move it so as to augment that portion of the air blast moved by the remainder of the deflector system.

More particularly, it is a feature of my invention that I utilize an auxiliary deflector forming part of the deflector system, this auxiliary deflector being preferably in the shape of a funnel for receiving a part of the air blast and funneling it into a preferred position so that it may preferably be used to augment another part of the air blast.

As a still further feature of my invention, I provide means for utilizing the lowermost angular sector of the air blast developed in the spraying and dusting machine of the Daugherty Patent No. 2,476,960 for augmenting those portions of the air blast directed by the deflector system found in the Daugherty patent. In this way, I eliminate the need for the plates described by Daugherty for blocking part of his deflector system, as the air of the blocked portion in my invention is utilized in an effective manner to augment other parts of the air blast.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention.

It will be well to add that while I show my invention applied particularly to the type of structure found in the Daugherty Patent No. 2,476,960, my contribution to the art is readily applicable to structures of the type set forth in the other two Daugherty patents to which I have alluded, and found also in the last filed Daugherty application in which the air blast flows radially because of the utilization of a particular type of blast developing means.

Figure 6:
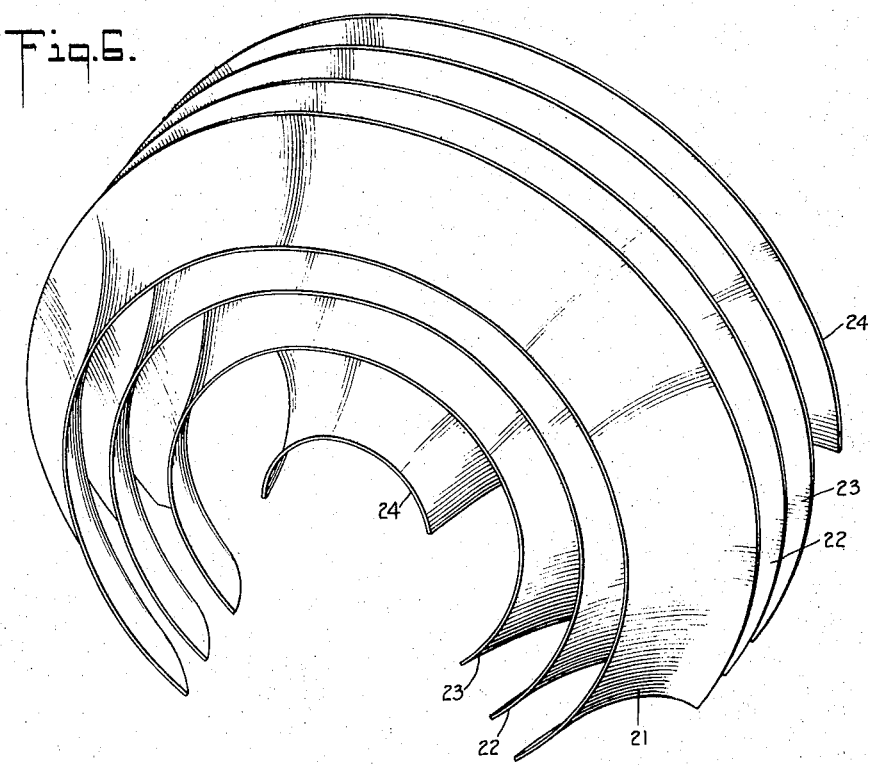
Figure 7:
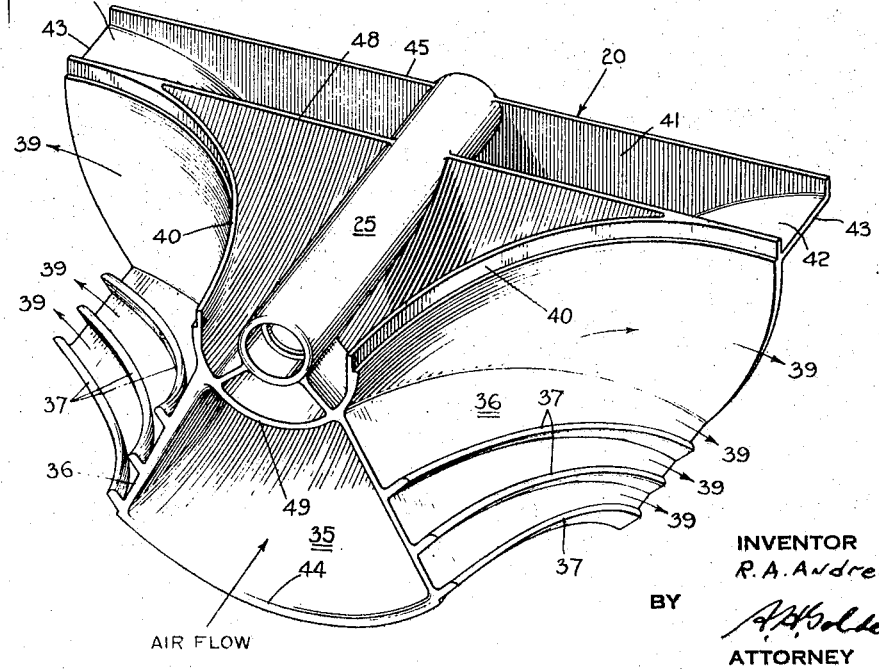

Referring now to the drawings, Fig. 1 is an elevation of a machine of the general class described, showing my invention applied thereto. Fig. 2 is a vertical section through the rear end of the machine shown in Fig. 1. Fig. 3 is a section taken generally along lines 3—3 of Fig. 2. Fig. 4 is a section taken generally along lines 4—4 of Fig. 2. Fig. 5 is a horizontal section taken along lines 5—5 of Fig. 2. Fig. 6 is a perspective view of the several spinnings forming part of the deflector system. Fig. 7 is a perspective view of the bottom portion of the deflector system forming my invention. Fig. 8 is a vertical section similar to Fig. 2 showing my invention utilizing a longer tunnel arrangement than shown in Fig. 2 for the development of the air blast, the general structure of Fig. 8 closely approximating the structure of the Daugherty Patent No. 2,476,960.

Referring now more particularly to the drawings and especially Fig. 1, reference numeral 10 indicates the chassis of my machine adapted to be pulled at hitch 11 by a suitable tractor, the chassis 10 being well supported by rubber tired wheels 12. The machine is of that general shape and character disclosed in the Daugherty patents and applications to which reference should be made for those details that are not here to be illustrated and described. I shall, in this application, merely set forth the general nature of the machine so that a proper understanding of my contribution to the art may be reached, but those desiring to learn more of the structural details thereof should refer to the Daugherty patents.

The generally central portion of the chassis 10 supports a tank 13 within which is contained the spraying material, the machine herein set forth being shown as dispensing spraying material only. The forward end of the machine designated generally by reference numeral 14 contains a suitable internal combustion engine E and pump P, shown in outline, the engine driving the pump for supplying spraying material to a series of spray nozzle carrying pipes 15 extending from main pipes 16 secured to the right hand end of the tank 13. The internal combustion engine E is also used for rotating the shaft 17 of the machine best shown in Fig. 2, and thereby rotating the propeller hub 18 and the series of propeller blades 19. The rotation of the propeller hub 18 and blades 19 generates a blast of air that is directed by a deflector system forming my invention and now to be particularly described. Before describing my deflector system, I should like to indicate that the manner in which the deflector system is fabricated is merely that method that I prefer to utilize at this time. Other methods of fabrication will readily occur to those skilled in the art as manufacturing methods develop. Similarly, the means utilized by me for assembling my deflector system relatively to the machine and for mounting the deflector system on the machine are not of the essence and are merely a preferred form that I now find desirable.

Referring now more particularly to Figs. 2 to 7 inclusive, and especially Figs. 6 and 7, my deflector system comprises a lower member designated generally by reference numeral 20 shown in Fig. 7, and a series of deflectors 21, 22, 23 and 24 shown in Fig. 6. Member 20 is preferably formed as a casting, although it may be built up of structural parts welded or bolted together. Formed at the upper portion of this member 20 is a bearing sleeve 25, and as best illustrated in Fig. 2, sleeve 25 has ball bearings 26 and 27 mounted therein for supporting the shaft 17 for rotation, and thereby for supporting for rotation the hub 18 carrying the propeller blades 19.

Through suitable brackets welded to the tank 13, such as the one illustrated at 28 in Fig. 1, the deflector member 20 is bolted or welded to the tank 13, and thus supported thereby. Member 20 is also formed with extending lugs 29 and 30 as best illustrated in Fig. 3 whereby it may be bolted to a structural ring 31 forming part of the relatively short tunnel within which rotate the several blades 19 of my propeller. Ring 31 and brackets 29 and 30, are suitably secured to a structural angular member 32 carried by the chassis 10 as best seen in Fig. 1, and in this manner, the entire deflector assembly together with the supporting means for the propeller are mounted on the machine to form a part thereof.

Air will be supplied to the propeller blades 19 in the direction of the air flow arrows shown in Figs. 1, 2 and 5, the air entering the machine through a screen 33 suitably secured to the rim of a ring 34 that is bolted or welded to the ring 31, and forms part of the tunnel for the propeller.

In the machine of the Daugherty Patent No. 2,476,960, the air blast is similarly developed by a propeller of the same type as that shown in this application. A series of ring deflectors are placed in the path of the air blast, so developed, and these ring deflectors act to deflect the air blast generally radially of the machine and therefore to each side of the machine toward the foliage to be sprayed. The bottom angular sector of the deflecting system is blocked off so that the air blast there generated will not flow downwardly against the ground. Rather, this portion of the air blast will rotate and then flow radially joining the remainder of the air blast. In addition, other parts of the deflector system may be blocked off, depending on the type of trees or foliage that is sprayed. As I have already indicated generally, it is the purpose of my invention to contribute means whereby it will be possible to utilize more effectively those portions of the air blast that are blocked from radial flow in the particular Daugherty machine to which I have made reference, it being reiterated that my invention is equally useful with other types of machines for better utilizing various portions of the air blast.

Referring now once again to Figs. 6 and 7, it will be noted that deflector member 20 in Fig. 7 is formed with a deflector passage that I term an air funnel, and designated generally by reference numeral 35. Through reference to Figs. 2 and 3, it will be readily appreciated that this air funnel 35 is in direct alignment with the propeller blades 19 for receiving directly that part of the air blast generated in the lowermost sector of the machine. The opposed side walls of the air funnel 35 are designated by reference numerals 36, and extending from each of these side walls 36 in a series of flanges 37. These flanges 37 are adapted to receive the three deflectors 21, 22, and 23, shown in perspective in Fig. 6, and more particularly, the lowermost opposed edges of these deflectors. Thus, as is best shown in Fig. 3, the lowermost edges of the three deflectors 21, 22 and 23 may be riveted, welded, or otherwise fastened to the flanges 37, rivets being the preferred means shown by me in my drawings and designated by reference numerals 38. The most central deflector 24 is secured similarly to the deflectors 21, 22, and 23 relatively to a flange 40 forming part of the casting of member 20 and also well illustrated in Fig. 7.

Naturally, the air blast at each side of the air funnel 35 will move against the deflectors 21, 22, 23, and 24 and will be directed thereby radially of the machine as designated by the arrows 39 in Figs. 2, 5 and 7. So far as these portions of the air blast are concerned, the several deflectors 21 to 24 inclusive function to deflect them radially of the machine as is also done by the deflectors of the Daugherty Patent No. 2,476,960. Thus, the several deflectors 21 to 24 inclusive will merely deflect radially of the machine that portion of the air blast accepted thereby.

The air funnel 35 is really an auxiliary deflector and will receive that portion of the air blast, the radial flow of which is blocked in the Daugherty application. In my invention, this portion of the air flow will flow into the air funnel 35 as shown by the arrow marked Air Flow in Fig. 7. Air funnel 35 extends inwardly of the casting forming the member 20 and terminates in a relatively wide and flared passage 41, having flared opposed bottom surfaces 42 terminating at 43 at each side of the machine. Terminal surface 43 at one side of the machine is well illustrated in Fig. 1.

The lower air deflecting surface of the air funnel 35 is designated by reference numeral 44 in Fig. 7 and also in Fig. 2. Fig. 2 shows this surface 44 as curving upwardly and terminating at 45 to form the end of the wide flared passage 41. In Fig. 4, the manner in which the lower surface 44 curves outwardly and upwardly so as to direct the air to passage 41 is also well illustrated. For containing the air that will flow upwardly through the passage 41 constituting the rear of the air funnel 35, I make use of parallel vertical plates 46. The rearmost plate 46 is secured to the terminal surface 45 of the bottom guide surface 44 of the air funnel. Therefore, the particular plate 46 forms the rear end wall for guiding upwardly that portion of the air blast that moves into the air funnel 35 and then into passage 41 thereof. The other vertical plate 46 is secured to the forward wall 48 forming the rearmost extension of the surface 49 of the upper containing wall of the air funnel 35, and best illustrated in Figs. 2 and 7.

It will now be appreciated that all of the air received by the air funnel 35 must flow between the lower and upper surfaces 44, 49 of the air funnel and between side walls 36 thereof into the passage 41. The air will then continue to flow between plates 46 upwardly and outwardly of the machine. In the particular machine illustrated by me, the air blast thus flowing into the air funnel 35 will actually augment the upper 180° of the air blast deflected by the series of deflectors 21, 22, 23, 24. It will be appreciated that by forming the air funnel 35 in a somewhat different manner, the air blast can be directed into any other angular sector to augment the air flow at that sector due to the series of deflectors 21—24. Also, the entire deflector system may be rotated into any desired position as where it is desired to cause the blast to move to but one side of the machine.

Since it is generally not desired to augment the air flow at the extreme upper sector, I arrange to utilize plates 50 best shown in Fig. 4 and extending from the sleeve 25 of member 20 upwardly and angularly. Obviously, the plates 50 will prevent the entry of air into the sector designated by reference numeral 51 in Fig. 4. Therefore, the air blast flowing through the air funnel 35 will be shut off from approximately the uppermost sector of 30°. It will be appreciated that the angular dimensions of this particular sector may be changed readily by mere manipulation or other movement of the plates 50. In Figs. 3 and 4 the augmented air flow zones are particularly indicated. It is of course to be understood that my air funnel 35 may be formed to lead other parts of the machine for differently directing the air flow therethrough.

In order to reinforce the several deflectors 21—24, and also the plates 46, I utilize a series of rods 52 as best shown in Figs. 2 and 3, these rods extending through parts of the deflectors and plates and reinforcing them in the positions indicated. Since the drawings show so clearly the relation of these reinforcing means 51 to the deflectors, and other parts of my machine, I do not believe further description thereof is necessary here.

I think it will now be rather apparent that the main portion of the air blast generated by the propeller blades 19 is suitably deflected radially by the several main deflectors 21—24 and that a portion of the air blast formerly not well utilized is now accepted by an auxiliary deflector comprising air funnel 35 and directed to any desired zone, preferably but not necessarily, for augmenting that portion of the air blast deflected by the main deflectors 21—24 inclusive.

As was earlier set forth, the spray material that is to be fed into the air blast is received by the several pipes 15 extending over the deflector system as well shown in the drawings and especially in Fig. 1. The directed air blast accepts the spray from the nozzles contained in the pipes 15 as well set forth in the prior Daugherty applications and patents. Where dust is to be used, it may readily be supplied to the air blast.

In Fig. 8 I show substantially the same structure as shown in Fig. 1, except that the relatively narrow ring 31 shown in Fig. 2 forming part of the tunnel for the propeller blades, has been eliminated. Substituted for the ring 31 there is a relatively longer ring 31a functioning in the same manner as ring 31 of the first modification. Within this relatively longer ring 31a there are formed a series of air straightening vanes 55 that support relatively to the ring 31a a central sleeve 56. This central sleeve 56 has welded thereto a suitable bracket 57 carrying bearings 58 for a shaft 59 on which is secured the hub 60 carrying the propeller blades 61. Shaft 59 is driven through a coupling 62 by the shaft 17, this being the same shaft that in the earlier modification has keyed thereto the hub 18 of the propeller.

Through the utilization of the relatively long ring 31a and the air straightening vanes 35, it has been found possible to supply to the deflector system an axially moving blast of air that is well adapted for radial deflection, all as is set forth in the Daugherty application. In other words, the modification of Fig. 8 differs solely from the earlier modification described by me in that it uses a longer tunnel, and more particularly, the longer tunnel of the Daugherty Patent No. 2,476,960 to which reference has several times been made.

I believe that the operation and construction of my invention will now be apparent to those skilled in the art.

I now claim:

1. In a spraying and dusting machine, means in said machine for generating a blast of air flowing in a predetermined direction relatively to said machine, air deflecting means positioned in the path of a portion of said air blast for directing at least said portion of the air blast in a direction angular to the direction of its generation, an auxiliary deflector, means positioning said auxiliary deflector in the path of at least part of the remainder of said air blast as it flows directly from said air blast generating means, said auxiliary deflector extending in a direction to effect the flow of that portion of the air blast received thereby to augment a part of the air blast directed by said air deflecting means, and means for feeding insecticide material to said air blast.

2. In a spraying and dusting machine, means in said machine for generating a blast of air flowing in a predetermined direction relatively to said machine, air deflecting means positioned in the path of said air blast for directing at least portions of the air blast in a direction angular to the direction of its generation, a funnel for receiving a part of said air blast, said funnel extending in a direction to effect the flow of that portion of the air blast received thereby to augment a part of the air blast directed by said air deflecting means, and means for feeding insecticide material to said air blast.

3. In a spraying and dusting machine, means in said machine for generating a blast of air flowing in a predetermined direction relatively to said machine, air deflecting means positioned in the path of a part of said air blast for directing said part of the air blast in a direction angular to the direction of its generation, an auxiliary deflector, means positioning said auxiliary deflector for receiving a further part of said air blast directly as it flows from said air blast generating means, said auxiliary deflector being formed so as to extend in a direction to effect the flow of that portion of the air blast directly received thereby to augment a part of the air blast directed by said air deflecting means, and means for feeding insecticide material to said air blast.

4. In a spraying and dusting machine, means in said machine for generating a blast of air flowing in a predetermined direction relatively to said machine, air deflecting means positioned in the path of a portion of said air blast for directing at least portions of the air blast in a direction angular to the direction of its generation, a funnel for receiving a part of said air blast and angularly spaced with relation to the axis of rotation of said shaft relatively to that portion of the air blast deflected by said air deflecting means, said funnel extending in a direction to effect the flow of that portion of the air blast received thereby to augment a part of the air blast directed by said air deflecting means, and means for feeding insecticide material to said air blast.

5. In a spraying and dusting machine of the class described, means for generating an air blast having a circular periphery of 360°, a first deflector positioned in the path of part of said air blast for directing the air blast at an angle to the direction of its generation, an auxiliary deflector for receiving a further part of said air blast in a particular angular sector of said 360° not directed by said first deflector, said auxiliary deflector being shaped and positioned to direct the air received thereby into a second angular sector angularly spaced from the sector in which it receives its air whereby to augment the air blast at said second angular sector directed by said first deflector, and means for feeding insecticide material to said air blast.

6. In a spraying and dusting machine of the class described, means for generating an air blast having a circular periphery, a first deflector positioned in the path of an angular sector of said air blast for directing said angular sector of the air blast at an angle to the direction of its generation, an auxiliary deflector for receiving a further part of said air blast in a particular angular sector of the circular periphery thereof, said auxiliary deflector being shaped and positioned to direct the air received thereby toward said first angular sector whereby to augment the air blast at said first angular sector directed by said first deflector, and means for feeding insecticide material to said air blast.

7. In a spraying and dusting machine of the class described, means for generating an air blast having a circular periphery of 360°, a deflector system positioned in the path of said air blast for directing the air blast, a funnel for receiving a part of said air blast in a particular angular sector, said funnel extending to direct the air received thereby into a second angular sector angularly spaced from the sector in which it receives its air whereby to augment the air blast at said second angular sector directed by said deflector system, and means for feeding insecticide material to said air blast.

8. In a spraying and dusting machine of the class described, means for generating an air blast having a circular periphery, a first deflector positioned in the path of the major angular portion of said air blast for directing the said portion of said air blast at an angle to the direction of its generation, an auxiliary deflector for receiving a minor angular portion of said air blast in a particular angular sector spaced from the angular sector opposite which said first deflector is positioned, said auxiliary deflector being shaped and positioned to direct the air received thereby away from the sector in which it receives its air to augment the air blast directed by said first deflector, and means for feeding insecticide material to said air blast.

9. In a spraying and dusting machine of the class described, means for generating an air blast having a circular periphery of 360°, an air funnel positioned in the path of a relatively small sector of the air blast to direct the said sector of air received thereby, said air funnel extending to direct the air received thereby into a second angular sector angularly spaced from the sector in which it receives its air whereby to augment the air blast at said second angular sector, and means for feeding insecticide material to said air blast.

10. In a spraying and dusting machine of the class described, means for generating an air blast, a deflector positioned in the path of a part of said air blast for imparting direction thereto through the contact of said air blast with said deflector, a funnel for receiving a further part of said air blast, said funnel being shaped and positioned to guide said further part of the air blast in a direction parallel to the direction imparted part of the air blast by said deflector, and means for feeding insecticide material to said air blast.

11. In a spraying and dusting machine of the class described, means for generating an air blast having a circular periphery of 360°, a deflector positioned in the path of said air blast for directing the air blast at an angle to the direction of its generation, a funnel for receiving a part of said air blast in a particular sector thereof, said funnel being shaped and positioned to direct the air received thereby into a second sector angularly spaced from the sector in which it receives its air whereby to augment the air blast at said second sector, and means for feeding insecticide material to said air blast.

12. In a spraying and dusting machine of the class described, means for generating an air blast having a circular periphery, a deflector positioned in the path of an angular sector of said air blast for directing the air blast at an angle to the direction of its generation, a funnel for receiving a part of said air blast in a second angular sector, said funnel extending in a direction to direct the air received thereby toward said first angular sector whereby to augment the air blast at said first angular sector, and means for feeding insecticide material to said air blast.

13. In a spraying and dusting machine of the class described, means for generating an air blast having a circular periphery of 360°, a funnel positioned in the path of a relatively small sector of the air blast that would normally flow in an unwanted direction and adapted to direct the said sector of air received thereby, said funnel being shaped and extending in a wanted direction to effect a flow of the air received thereby toward said wanted direction, and means for feeding insecticide material to said air blast.

14. In a spraying and dusting machine of the class described, means for generating an air blast, a deflector for deflecting a part of said air blast and positioned in the path of the greater portion of said air blast, a funnel positioned in the path of a relatively smaller portion of the air blast not flowing against said deflector for receiving air that would normally flow in an unwanted direction if directed by said deflector and adapted to direct the said part of the air received thereby, said funnel being shaped and extending in a wanted direction to effect a flow of the air received thereby toward said wanted direction, and means for feeding insecticide material to said air blast.

15. In a machine of the class described, a tunnel, means for developing a blast of air flowing outwardly of one end of said tunnel, a series of substantially ring-like deflectors positioned in the path of said air blast and curved outwardly to deflect the air blast radially relatively to the direction of flow of said air blast, said ring-like deflectors extending for a major portion of the 360 degrees of said blast of air, an auxiliary deflector positioned to accept the blast of air in an angular sector forming a relatively minor portion of the 360 degrees of said blast of air, said auxiliary deflector being shaped and positioned to direct the air received thereby to augment the air blast at said angular sector directed by said ring-like deflectors, and means for feeding insecticide material to said air blast.

16. In a machine of the class described, a tunnel, means for developing a blast of air flowing outwardly of one end of said tunnel, a ring-like deflector positioned in the path of said air blast and curved outwardly to deflect the air blast radially relatively to the direction of flow of said air blast, said ring-like deflector extending for an angular sector comprising a major portion of the 360 degrees of said blast of air, an auxiliary deflector positioned to accept the blast of air in an angular sector forming a relatively minor portion of the 360 degrees of said blast of air, said auxiliary deflector being shaped and positioned to direct the air received thereby to augment the air blast at said first angular sector directed by said ring-like deflector, and means for feeding insecticide material to said air blast.

17. In a machine of the class described, means for generating an axially flowing blast of air, a confining surface about said air blast defining the outer periphery of said blast of air, a funnel for receiving a part of said air blast in a particular angular sector of the area defined by said confining surface, a series of deflector rings cut away to define a space for the said funnel, said deflector rings extending to said funnel where cut away and positioned for receiving the air blast from the remainder of the area thereof defined by said confining surface, and means for feeding insecticide material to said air blast.

RICHARD A. ANDREWS.

REFERENCES CITED

The following references are of record in the file of this patent:

UNITED STATES PATENTS

| Number | Name | Date |
|---|---|---|
| 1,723,953 | Ryder | Aug. 6, 1929 |
| 1,864,198 | Johnson | June 21, 1932 |
| 2,203,742 | Overton | June 11, 1940 |
| 2,220,082 | Daugherty | Nov. 5, 1940 |
| 2,331,107 | Daugherty | Oct. 5, 1943 |
| 2,476,960 | Daugherty | July 26, 1949 |